United States Patent [19]

Talley, Jr.

[11] 3,868,326

[45] Feb. 25, 1975

[54] DISTRIBUTOR FOR CENTRIFUGAL SCREEN SEPARATOR

[75] Inventor: Walter J. Talley, Jr., Brentwood Park, Calif.

[73] Assignee: Sweco Inc., Los Angeles, Calif.

[22] Filed: Mar. 12, 1973

[21] Appl. No.: 340,087

[52] U.S. Cl. ............................... 210/377, 210/380
[51] Int. Cl. ............................................ B01d 33/02
[58] Field of Search .............. 210/377, 380, 77, 78; 209/270, 303, 304, 340, 354, 273

[56] References Cited
UNITED STATES PATENTS

| | | | |
|---|---|---|---|
| 2,312,545 | 3/1943 | Haug | 210/380 X |
| 2,500,965 | 3/1950 | Symons | 209/303 |
| 3,483,991 | 12/1969 | Humphrey | 210/377 |
| 3,511,373 | 5/1970 | McKibben et al. | 209/254 X |
| 3,727,768 | 4/1973 | Talley, Jr. | 210/380 X |
| 3,775,311 | 11/1973 | Mook et al. | 210/78 X |

Primary Examiner—Roy Lake
Assistant Examiner—James W. Davie
Attorney, Agent, or Firm—Lyon & Lyon

[57] ABSTRACT

A device is disclosed herein for distributing solids-containing liquids from a central inlet to a rotating screen cage used as a centrifugal separator. The device includes a first distributor for directing the influent radially outward against the rotating screen cage. A second distributor is located below the first distributor and is caused to rotate with the screen cage. This second distributor is designed to receive influent which has rebounded from the rotating screen cage and return that rebounded influent to a lower portion of the screen cage by centrifugal action. Vertical plates radially disposed about a distributor body and a horizontal circular plate located beneath the vertical plates act to receive and return rebounded influent. Notches are provided in the vertical plates to prevent return of rebounded influent to solid portions of the screen cage.

10 Claims, 3 Drawing Figures

DISTRIBUTOR FOR CENTRIFUGAL SCREEN SEPARATOR

This invention relates to distributors for centrifugal screen separators. More specifically, this invention is directed to an improved means for distributing influent to a centrifugal screen separator by returning rebounded influent to the screen cage through the use of centrifugal force.

Screening systems have been developed for concentrating solids which are suspended in relatively large volumes of liquid. Some of these systems incorporate a centrifugal screen cage with means for distributing influent to the inner side of the screen cage. Systems of this nature are disclosed in McKibben United States letters Patent Nos. 3,511,373 and 3,539,008, in Talley and Wright United States letters Patent No. 3,627,130, and in Talley United States letters Patent No. 3,707,235. The following co-pending applications and patents also illustrate such rotating screen separators: Robert P. Miller, Jr. United States letters Pat. No. 3,739,912; Philip H. Mook United States letters Patent No. 3,775,311; Theodore R. Westfall United States letters Patent No. 3,737,038; Philip H. Mook United States letters Patent No. 3,743,094; Walter J. Talley, Jr. United States letters Patent No. 3,727,768; and Ser. No. 263,540, entitled "Wastewater Concentrator with Slotted Distributor," filed June 6, 1972, in the name of Walter J. Talley. The above-identified patents and co-pending applications are assigned to the assignee of the present invention and the disclosures are incorporated herein by reference.

These screening systems find extensive use in the concentration of solids contained in wastewater. The centrifugal screen separators are capable of handling great quantities of liquid with a relatively small amount of solids contained therein, making them ideal for wastewater applications. One requisite for efficient high-speed screening using these systems is that a substantial portion of the influent will be distributed to and processed by the rotating screen cages. An ideal distribution of influent to the screen cages would therefore include the deposition of all of the influent onto the screen cages without the rebounding of any influent therefrom. Under such an ideal system, substantially all of the liquid would be processed through the screen, making the concentrate very dry. However, several factors operate to prevent an ideal system.

The relative speed of the influent with respect to a rotating screen cage at the point of impact necessary for efficient operation of the overall unit causes a certain degree of influent to rebound from the screens. Further, the high volume and speed of the influent can cause turbulence therein which further adds to the problem of influent rebounding from the screen cages. Also, a significant portion of the screen area is taken up by solid structural and frame members which cannot process the influent. A significant portion of this influent also rebounds from the screen structure.

When it is necessary or preferred that the concentrate be relatively dry, the influent which is rebounded from the interior of the rotating screen cage must not be allowed to pass with the concentrate from the separator. One known method for preventing the mixing of the concentrate with the rebounded influent is to position a receiver concentrically interior to the concentrate receiver. Since most of the concentrate travels directly down the wall of the screen cage, a second receiver having a diameter somewhat smaller than the inside diameter of the screen cage can be employed to catch rebounded influent which tends to move inwardly away from the screen cage. However, there are drawbacks to this system which include the necessity of recycling the rebounded influent in order that it can be reintroduced to the separator. Further, this means for separating rebounded influent from concentrate is capable of separating only a portion of the rebounded influent from the concentrate and cannot capture the influent which falls near the path of the concentrate.

A principle object of the present invention is to provide a distribution means which can process rebounded influent to greatly increase the efficiency of the separation system. A rotating distribution means is employed to intercept and return influent rebounded from the screen cage. This distribution means is positioned beneath the primary distributor within the screen cage. By returning the rebounded influent to the screen cage, a greater percentage of the influent will contact and spin with the screen cage and less liquid will fall down the inside of the screen cage and dilute the concentrate.

A second object of the present invention is to provide a means for returning rebounded influent to a rotating screen cage by employing a series of rotating vertical plates located within the screen cage. The rotation of the plates causes them to intercept the rebounded influent and redistribute it by centrifugal force against the screen cage. A horizontal plate is also provided beneath the vertical plates to further insure that the rebounded influent will be prevented from passing into the concentrate receiver. Thus, the distribution means insures that all of the influent first rebounded from the screen cage will be redistributed to that screen cage for separation of the concentrate from the liquid carrier.

Another object of the present invention is to provide a distribution means for returning rebounded influent to the screen cage which will distribute the rebounded influent only to screened areas of the screen cage. A notch is cut from the rotating vertical plates to prevent interception of rebounded influent at a point where interception and redistribution to the screen cage would cause further rebounding of the influent because of impact with non-screened area of the screen cage. In this manner, the structural and frame segments of the screen cage can be avoided which lie in a horizontal plane. Also, the path of the redistributed influent can be directed to avoid encountering structural or frame members vertically disposed on the screen cage by causing the distribution means to rotate with the screen cage.

Following the above objects, a device is provided which receives rebounded influent from the inner side of a rotating screen cage and redirects that influent to the screen cage for further separation. This redistribution is accomplished selectively across the working screen area of the rotating screen cage. Further means are provided to positively prevent influent from traversing downward into the concentrate receiver. Further objects and advantages will become apparent from the discription herein.

Figure 1:
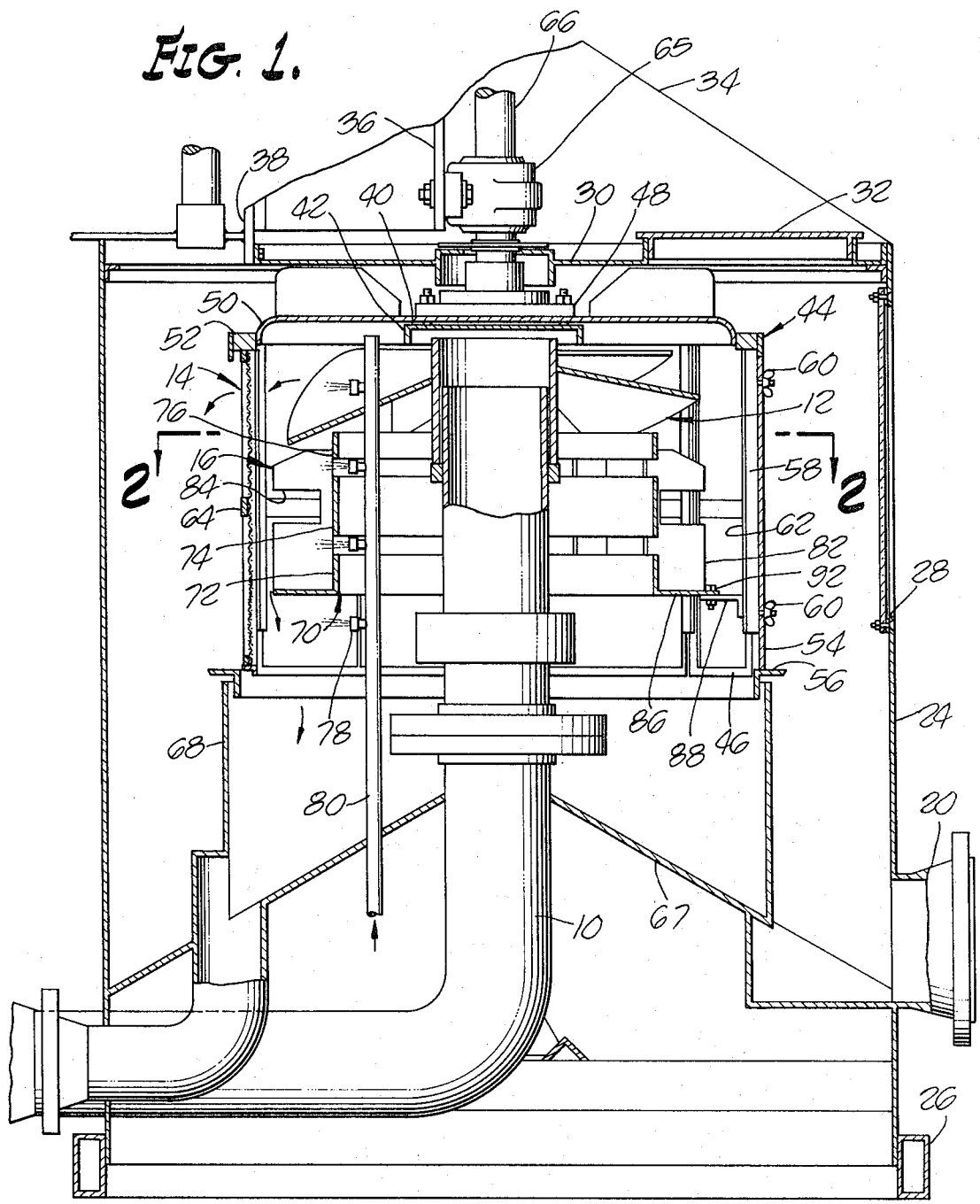
FIG. 1 is a cross-sectional view of a centrifugal screen separator employing the present invention.

Turning now to the drawings, and particularly FIG. 1, a centrifugal screening system is disclosed which receives influent through inlet pipe 10 and distributes that influent across distributor 12 onto the rotating screen cage generally designated 14. The influent which is rebounded from the rotating screen cage 14 is captured and redistributed to the screen cage 14 by the secondary distributor generally designated 16. The screen cage 14 separates the influent into a screened effluent exhausted through outlet 20 and a concentrate exhausted through outlet 22.

More specifically, a centrifugal screen separator is shown as having a cylindrical housing 24 mounted on a circular base 26. An access window 28 is provided for inspecting the performance of the unit. A top 30 acts to enclose the separator. A screen replacement access port 32 is provided through top 30. In some applications it is desirable to enhance the flow of air into the screen cage and the top 30 can be replaced by a more open structure. The cylindrical shape of the housing 24 lends itself to ease of fabrication and does not specifically add to the efficient operation of the unit. An extension 34 of the cylindrical housing 24 may be employed as a mounting base for the power source (not shown) and for the screen cage 14 through structural members 36 and 38.

Solids-containing influent is directed into the centrifugal separator through inlet pipe 10. The influent is directed upward against a circular plate 40 which has a depending lip 42. The circular plate 40 in combination with the depending lip 42 causes the influent to be redirected onto the primary distribution means 12. The influent may alternately be directed into the separator through the top. In such an instance, the influent would be directly discharged onto the distributor 12. The screen cage 14 would most conveniently be mounted from below with such a configuration. The primary distribution means 12 illustrated in the present drawings is fully disclosed in Talley United States letters Patent 3,627,130, the disclosure of which is incorporated herein by reference. Any means may be employed which will distribute the wastewater somewhat radially against the screen. It is believed that the primary distribution means 12 employed in the present embodyment is one of the most efficient means for accomplishing such initial distribution. A plurality of these primary distribution means 12 may be employed in layered orientation to increase the use of screen area within individual units. The primary distribution means 12, as incorporated in this embodiment, includes a plurality of inclined plates along which the influent will dispurse and flow. The outer edges of these plates are angled with respect to the screen cage 14 in order that the influent will be distributed against the screen cage in overlapping inclined sheets thereby spreading the influent across a greater area of the screen cage 14. The inclined plates also slope along all but the upper edge downward and away from the central discharge point. This allows the influent to flow freely toward the screen cage 14. The primary distribution means 12 does not rotate in this configuration and therefore the first distributed influent flows substantially radially outward and slightly downward onto the screen cage 14. Because the primary distribution means 12 does not rotate with the screen cage 14, it is impractical to attempt to selectively prevent influent from impinging on areas of the screen cage which have structural and frame memberrs that extend vertically through the screen cage. Naturally, the primary distribution means 12 may be positioned to avoid horizontal obstructions as is shown in FIG. 1.

The screen cage generally designated 14 provides for the screening of the influent solids-containing liquid to remove suspended solid particles therefrom. The screen cage 14 includes a substantially cylindrical screen mounting structure 44 and individual screens 46. The screen mounting structure 44 has a supporting hub 48 to which a top member 50 is attached. A circular rim 52 is fixed about the top member 50 and has a vertical support members 54 depending therefrom. A circular base ring forms the bottom of the screen mounting structure 44. Screens 46 are sized to fit between the circular rim 52 and the base ring 56 and between the several vertical supports 54. Guide members 58 are fixed to each of the vertical supports 54 by wing nuts 60. Guide members 58 include locking strips 62 which together with the guide members 58 and vertical support members 54 form channels into which the screens 46 may be positioned and locked in place by wing nuts 60. The screens 46 are framed by conventional means. The mesh size of the screens 46 is dependent upon the minimum size of particles which is desired to be screen from the influent. The screens 46 may either be divided or supported by member 64 which extends horizontally across the width of each screen area defined by the circular rim 52, the base ring 56 and the vertical supports 54. The system may alternately employ screens 48 which have a height equal to one-half of the distance between the circular rim 52 and the base ring 56. In such an application, two screens are positioned between each vertical support 54. In such an instance, a nonscreening area results at the same location as the nonscreening area created by supports 64. This screen joint or structural support benefits screen life and screen rigidity.

Figure 2:
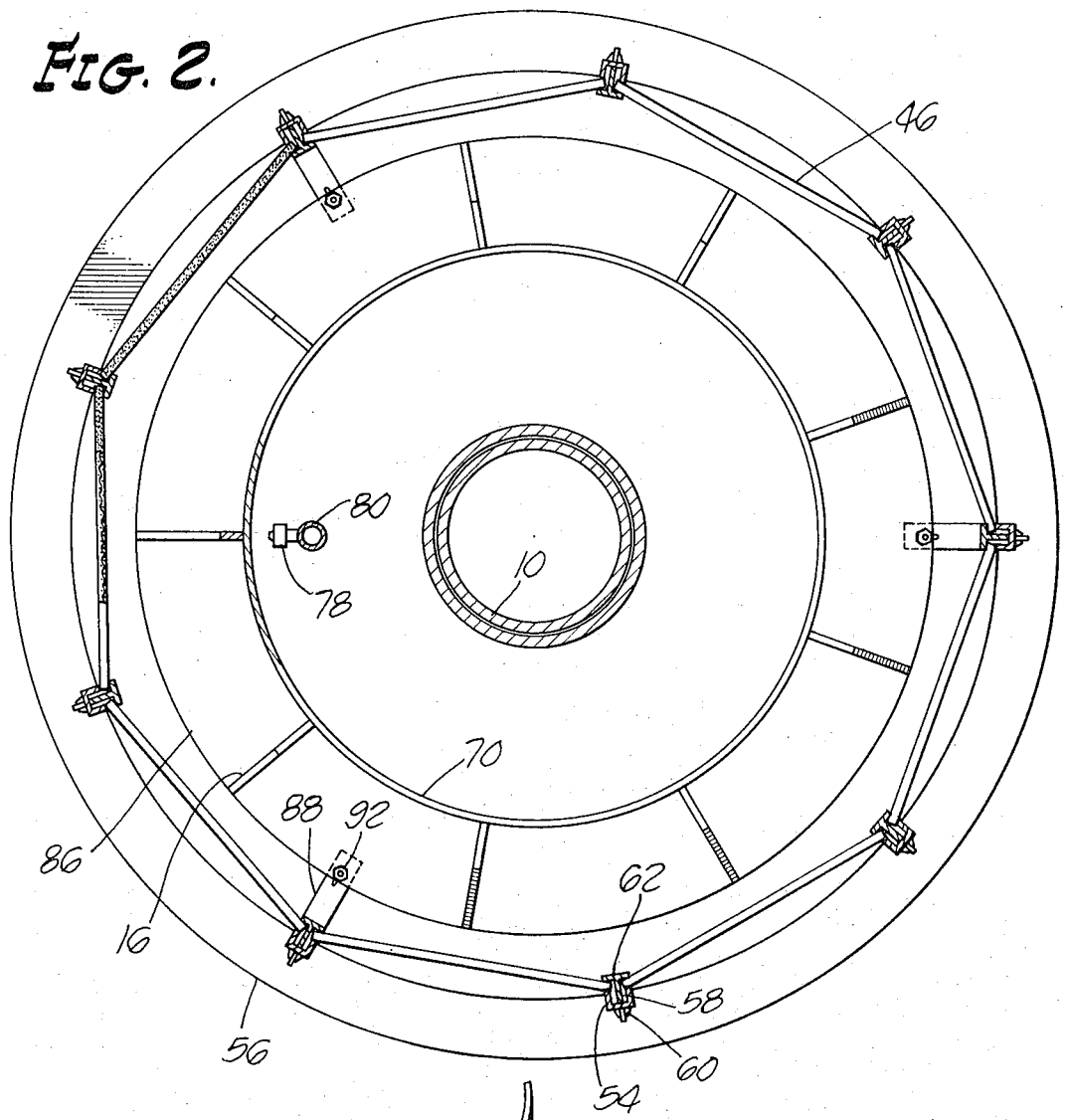
FIG. 2 is a cross-sectional view taken along line 2—2 of FIG. 1 illustrating a plan view of the distributot used to return rebounded influent to the screen cage. A portion of the distributor is broken out in FIG. 2 to illustrate the plan fiew of lower portion of said distributor.

The screen cage 14 is rotatably mounted to the structural member 36 through bearings 65 (only the lower bearing is shown) by shaft 66. The shaft 66 is driven by convention means and in turn drives the screen cage 14. The shaft 66 is directly fixed to the supporting hub 48. The screen cage has a sufficient number of screen segments 46 to make a substantially cylindrical screen cage 14. Nine screens 46 are shown in FIG. 2 which is an acceptable number. The speed at which the screen cage 14 is rotated is largely dependent on the diameter of the screen cage 14. A rotational speed of 114 RPM is employed for screen cages having a diameter of 30 inches.

The influent which is processed by the screen cage 14 is divided into a screen effluent and a concentrate. The screened effluent is discharged through the screen cage 14 and is allowed to pass from the system. The concentrate is trapped within the screen cage and must flow downward along the inside of the screen cage 14 to be discharged below the screen cage 14. A concentrate receiver is formed by a conical receiving plate 67 and a cylindrical wall 68. Pipe 22 provides an outlet for the concentrate receiver. The screened effluent receiver is formed by the cylindrical wall 68, the conical receiving plate 67 and the outer wall of the separator 24. An outlet is provided through pipe 20. The cylindrical base ring 56 extends outward over the edge of the cylindrical wall 68 to preclude remixing of the screened effluent and the concentrate and effectively separate the two receivers.

A secondary distribution means 16 is provided below the primary distribution means 12. This secondary distribution means 16 is designed to receive influent rebounded from the screen cage 14 and redistribute that influent to the rotating screen cage 14 at a lower position. This secondary distribution means 16 incorporates a cylindrical body 70 situated below the distribution means 12. This cylindrical body 70 is comprised of three cylindrical sleeves, a lower sleeve 72, a middle sleeve 74 and an upper sleeve 76. The cylindrical body is constructed in this manner to allow nozzles 78 to spray jets of water provided by a manifold 80 at the screen cage 14 to allow automatic cleaning of the inside of the screen cage 14. The cylindrical body 70 has a diameter substantially smaller than that of the screen cage 14 in order that the rebounded influent will tend to be intercepted by the outer portions of the secondary distribution means before reaching the body 70. The cylindrical body 70 also extends from a position beneath the primary distribution means which is inward from the outer edge of the primary distribution means 12 and is sufficiently close to the bottom side of the primary distribution means 12 so that there is little likelihood that any significant amount of rebounded influent would pass over the upper edge of the cylindrical body 70. The cylindrical body 70 extends preferably to a point above the bottom edge of the screen members 46 in order that any influent redistributed to the screens at the lower most portion of the secondary distribution means 16 will contact the screen cage 14 high enough so that effective screening of the influent can take place before encountering the concentrate receiver.

Vertical plates 82 are radially disposed about the cylindrical body 70 of the secondary distribution means 16. These vertical plates 82 receive rebounded influent and redirect that influent by centrifugal force outwardly at the screen cage 14 for further separation. The vertical plates 82 are rigidly fixed to the cylindrical sleeves 72, 74 and 76 of the cylindrical body 70 and extend outwardly to a point near the screen cage 14. The space between the outer edge of each vertical plate 82 and the screen cage 14 prevents a buildup of concentrate at the junction of the screen members 48 and the vertical plates 82. Further, if the secondary distribution means 16 is caused to rotate independently of the screen cage 14, excessive wear of the screens 46 would result. By providing a space between the vertical plates 82 and the screen members 46, the rebounded influent will be projected across a short space and will consequently distribute across a broader area of the screen cage. However, it is advantageous to have the outer edge of the vertical plates 82 near the screen member 46 in order that as much rebounded influent as possible encounter a vertical plate 82 as that rebounded influent falls away from the screen cage 14. It is also beneficial that the vertical plates 82 as well as the cylindrical body 70 extend downward from the primary distribution means 12 to a point where there is little likelihood that rebounded influent would not have encountered the secondary distribution means 16 at least once as it moves downward through the separator. To reduce the chance that rebounded influent would not be returned at least once to the screen cage 14 by contacting and being flung from the secondary distribution means 16, the vertical distance which the influent must fall to escape either the screen cage 14 or the secondary distribution means 16 must be substantially larger than the horizontal distance which the rebounded influent must traverse to encounter either the screen 14 or the secondary distribution means 16. As can be seen in FIG. 1, the screen cage 14 is separated from the vertical plates 82 at the closest point by a distance which is less than one-half the length of each vertical plate 82. It is also believed that currents of air are established within the screen cage 14 which are directed radially outward by the secondary distribution means 16 as it rotates which also help to insure that rebounded influent will not pass downward out of the separator without a second contact with the screen cage 14. Again, the screen cage 14 should preferably extend beyond the bottom edge of the secondary distribution means 16 in order that the redistributed influent will intercept and be processed by the separator screens 46. It has been found that sufficient screen area will be provided for this purpose by locating one fourth of the total screen area below the bottom of the secondary distribution means 16.

Each vertical plate 82 has the upper outward corner removed to insure unobstructed passage of the first distributed influent to the rotating screen cage 14. It is not necessary that the vertical plates 82 extend above the outer edge of the primary distribution means 12 as any rebounded influent which could be received above and behind the bottom edge of the primary distribution means preferably should fall below the outer edge of the distribution means 12 before it is intercepted and redistributed to the screen cage 14 in order that the redistributed influent will not impact against the bottom side of the primary distribution means 12.

The number of vertical plates 82 required in order that there is assurance that rebounded influent will not be able to pass completely through the path of the vertical plates 82 before any given vertical plate 82 could intercept that influent is dependent upon the speed of the rebounded influent and the rotational velocity of secondary distribution means 16. The number of plates 82 necessary to intercept such influent is also dependent upon the length of each of the vertical plates 82, i.e., the distance through which such rebounded influent must travel before escaping the next oncoming vertical plate 82, For other reasons set forth below, the vertical plates 82 are most advantageously positioned at points corresponding to the centers of each of the screen segments 46 as shown in FIG. 2. Because of this placement of the vertical plates 82 and because of speeds at which the screen separators most efficiently operate, there has been found to be no problem experienced with influent passing through the path of the vertical plates 82 without impacting one of these plates. If the rotational speed of the secondary distribution means 16 is reduced below that of the screen cage 14 or fewer vertical plates are employed, this problem should be reconsidered.

It is advantageous when possible to distribute influent only to areas of the screen cage which are covered by screen elements. When influent contacts a vertical support 58 or any other solid member, there is a tendency for a greater amount of influent to rebound from the screen cage than when the influent impacts the screen elements. The present secondary distribution means 16 avoids the impact of influent distributed by the secondary screen means 16 against the solid portions of the screen cage 14. A notch 84 is cut into each vertical plate 82 in order that the rebounded influent will not intercept the secondary distribution means and be subsequently redistributed to the screen cage 14 at a point adjacent the center support or frame member 64. Naturally, any obstruction which exists on a portion of the screen cage can be so treated if that obstruction does not extend vertically along a substantial portion of the screen cage. The influent which would normally impact the vertical plates 82 at a point where notch 84 is will continue downward until it impacts one of the vertical plates 82 below the notch 84. The rebounded influent would then be redistributed at the screen cage below the horizontal obstruction 64. To prevent impingement of the redistributed influent against the vertical supports 58 of the screen cage 14, the secondary distribution means 16 is caused to rotate with the screen cage 14 and the vertical plates 82 are positioned between the vertical supports 58, the trajectory of the distributed rebounded influent will intercept a screen element 46 located near the respective vertical plate 82. In this manner, substantially all of the rebounded influent will be redistributed to screened areas of the screen cage 14 with a corresponding increase in material screened rather than again rebounded. In the present embodiment, one vertical plates 82 is provided for each of the vertical supports 58. The present device incorporates nine screen elements and therefore there are nine vertical plates 82. This arrangement can best be seen in FIG. 2.

Below the vertical plates 82 and adjacent the bottom edge of the lower most sleeve 72, a base ring 86 may be rigidly fixed to the secondary distribution means 16. This base ring 86 insures that all of the influent rebounded into the secondary distribution means 16 will be redistributed to the screen cage 14, Further, the base ring 86 provides structural support to the entire secondary distribution means 16. Because this base ring is horizontally disposed, the material distributed thereby will intercept the screen cage 14 along a narrow horizontal band. If a great deal of rebounded influent were distributed by this base ring 86, the screen cage would tend to be overburdened along that horizontal band. Therefore, it is advantageous to design the secondary distribution means 16 as described above to cause substantial amounts of the rebounded influent to intercept and be redistributed by the vertical plates 82. It is also advantageous that the base ring 86 be displaced from the screen cage 14 by a distance sufficient to insure that the concentrate will not be obstructed in its downward passage into the concentrate receiver. Naturally, the minimum distance between the base ring 86 and the rotating screen cage 14 would depend on the quantity of solids contained within a specific volume of liquid. Further, the ability of the concentrate to flow down the screen cage 14 during continuous operation of the separator would also dictate the distance required between the base ring 86 and the screen cage 14. In the present embodiment, the base ring 86 extends outward from the body 70 of the distribution means 16 the same distance as the vertical plates 82.

Figure 3:
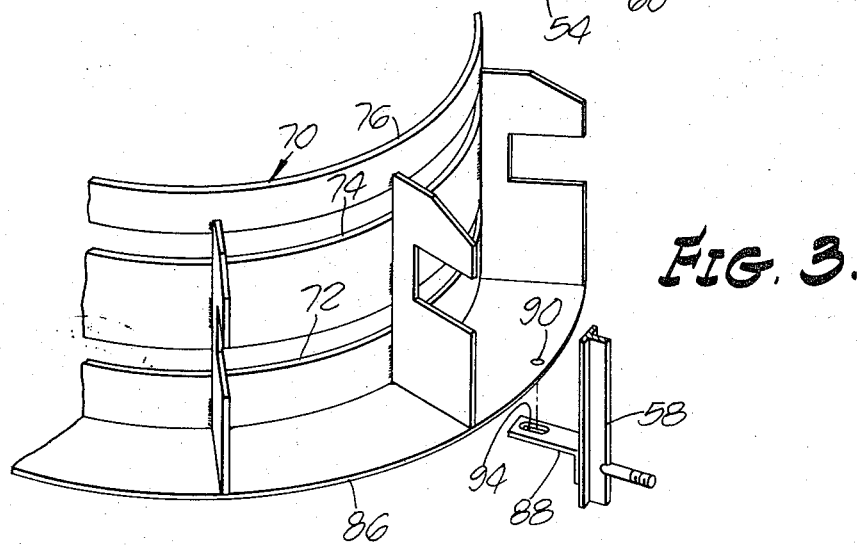
FIG. 3 is a fragmentary perspective view of the distributor showing an exploded assembly of the distributor with the screen cage.

To provide centrifugal action for distributing the rebounded influent from the secondary distribution means 16, means are provided to rotate the secondary distribution means. In the present embodiment, the secondary distribution means 16 is mounted onto the frame of the screen cage 14 as shown in FIG. 3. Three brackets 88 are provided symetrically about the secondary distribution means 16. The brackets 88 are welded to three of the vertical support members 58 and extend inward therefrom to intercept the base ring 86. Holes 90 are provided in the base ring 86 to accommodate fasteners 92. Slots 94 are provided in the brackets 88 to attach fasteners 92.

Thus, a centrifugal screen separator is disclosed which has an improved distribution means. This improved distribution means includes secondary distribution means for returning rebounded influent to screened areas of a rotating screen cage. Having fully described the present invention, it is to be understood that the invention is not to be limited to the details herein set forth but that it is of the full scope of the appended claims.

I claim:

1. A device for distributing solids-containing liquid to a rotary screen edge in a centrifugal screen separator comprising
    primary distribution means positioned within the rotary screen cage for distributing solids-containing liquid influent to the inner side of the rotary screen cage; and
    secondary distribution means positioned within the rotary screen cage below said first distribution means for receiving solids-containing liquid influent rebounded from the rotary screen cage and returning that rebounded influent to the rotary screen cage, said secondary distribution means including a body extending to substantially prevent solids containing liquid influent from passing interior thereof, vertical plates radially disposed and extending from said body and fixed thereto, said secondary distribution means being fixed to rotate with the rotary screen cage.

2. The device of claim 1, wherein the secondary distribution means further includes a base ring located about said body and beneath said vertical plates, said base ring being constrained to rotate with said body.

3. The device of claim 1, wherein notches are provided in said vertical plates to prevent the redistribution of the rebounded influent along a horizontal band on the rotary screen cage.

4. The device of claim 1, wherein said secondary distribution means is constrained to rotate with the rotary screen cage, said vertical plates each being positioned radially inward from a screened area of the rotary screen cage.

5. The device of claim 4, wherein each of said vertical plates is separated from the rotary screen cage by a distance which is no greater than one-half the length of each of said vertical plates.

6. The device of claim 1, wherein said body is horizontally divided to allow jets of water to continuously project therethrough.

7. The device of claim 1, wherein said rotary screen cage is substantially cylindrical.

8. A centrifugal screen separator comprising
    a support structure;
    a substantially cylindrical screen cage rotatably supported on said support structure;

drive means coupled with said screen cage for rotating said screen cage;

an effluent receiver for collecting effluent from the outer side of said screen cage;

a concentrate receiver for collecting concentrate from the inner side of said screen cage;

primary distribution means for distributing a solids-containing liquid influent substantially radially outward to the inner side of said screen cage; and secondary distribution means mounted concentrically interior of said screen cage to said screen cage, below said primary distribution means and comprising a cylindrical body, vertical plates radially disposed about said body and rigidly fixed thereto, and a base ring located about and affixed to said body and beneath said vertical plates and extending from said body substantially across the lower interior portion of said substantially cylindrical screen cage to redistribute solids-containing liquid influent to said substantially cylindrical screen cage.

9. The device of claim 8, wherein said vertical plates are disposed radially inward of screened areas of said screen cage and displaced therefrom.

10. The device of claim 8, wherein at least one of said vertical plates includes a notch to selectively prevent distribution of the liquid to a portion of said screen cage.

* * * * *